United States Patent [19]

Imura

[11] Patent Number: 4,801,212
[45] Date of Patent: Jan. 31, 1989

[54] OPTICAL SYSTEM FOR RADIATION THERMOMETER

[75] Inventor: Kenji Imura, Osaka, Japan

[73] Assignee: Minolta Camera Kabushiki Kaisha, Osaka, Japan

[21] Appl. No.: 62,848

[22] Filed: Jun. 16, 1987

Related U.S. Application Data

[63] Continuation of Ser. No. 792,793, Oct. 30, 1985, abandoned.

[30] Foreign Application Priority Data

Oct. 30, 1984 [JP] Japan ................... 59-229909

[51] Int. Cl.[4] .................. G01J 05/08; G01J 05/20
[52] U.S. Cl. .................. 374/130; 350/503; 356/43
[58] Field of Search .......... 370/130, 124, 129; 356/43, 19; 250/231 R, 353; 354/407; 350/445

[56] References Cited

U.S. PATENT DOCUMENTS

| | | | |
|---|---|---|---|
| 881,127 | 3/1908 | Jacob | 356/19 |
| 2,761,072 | 8/1956 | Wormser | 356/43 X |
| 2,813,458 | 11/1957 | Trippet et al. | 350/503 |
| 2,869,369 | 1/1959 | Howell | 374/130 |
| 3,026,413 | 3/1962 | Taylor | 250/339 |
| 3,056,062 | 9/1962 | Garbung et al. | 250/330 X |
| 3,066,569 | 12/1962 | MacDonald | 350/620 |
| 3,293,915 | 12/1966 | Banca et al. | 374/129 |
| 3,409,772 | 11/1968 | Wormser | 250/353 |
| 4,300,047 | 11/1981 | Fujii et al. | 250/330 |
| 4,425,043 | 1/1984 | Van Rosmalen | 250/201 X |
| 4,477,720 | 10/1984 | Pearson | 250/201 |
| 4,549,802 | 9/1984 | Ohtaka | 354/407 |
| 4,632,532 | 12/1986 | Matsumura et al. | 354/407 X |
| 4,664,515 | 5/1987 | Imuva et al. | 356/43 |

*Primary Examiner*—Daniel M. Yasich
*Attorney, Agent, or Firm*—Price, Gess & Ubell

[57] ABSTRACT

An improved optical system for a radiation thermometer is provided wherein a range finding system is coincident with the optical system of the infrared measurement. The finder optical system can utilize various forms of focusing members.

13 Claims, 4 Drawing Sheets

26a

26a

OPTICAL SYSTEM FOR RADIATION THERMOMETER

This is a continuation application of Ser. No. 792,793, filed on Oct. 30, 1985 now abandoned.

BACKGROUND OF THE INVENTION

1. Field of the Invention

The present invention relates to a radiation thermometer for measuring the temperature of an object with an infrared light beam and more specifically to an optical system therefor.

2. Description of the Prior Art

A radiation thermometer has usually been employed for measuring the temperature of a measuring object at a position displaced therefrom. Therefore the measuring range of the thermometer is comparatively small. Moreover, since it is essential for an operator to accurately recognize the measured temperature for the measuring object, a finder is provided. An example of an optical system of such a radiation thermometer is shown in FIG. 1. In FIG. 1, a light bundle used for temperature measurement is respectively reflected by a main mirror (2) and a sub-mirror (4) and enters a light sensing element (6) and thereby a temperature can be measured in accordance with the infrared light beam component received by element (6). Meanwhile, a light bundle for the finder used for monitoring a measuring object passes a finder lens (8) provided in front of the sub-mirror (4), is guided to the outside of measuring light bundle by a mirror (10), is reflected again by a mirror (12) and is finally guided to a finder lens system (14). A measuring mark plate, having a mark for displaying the measuring object area within the visual field of the finder, is indicated as numeral (16). Accordingly, the measuring object area is displayed by said mark within the visual field of finder in accordance with the light sensing area of the light sensing element (6) for recognition of measuring object.

In the prior art described above, the optical system for measurement consisting of the main mirror (2), sub-mirror (4) and light sensing element (6), and the optical system for monitoring consisting of the finder lens (8), mirrors (10), (12) and finder lens system (14) respectively have independent optical axes. Therefore adjustment is necessary to coincide these two optical axes and it is difficult to form a compact system as a whole. Particularly, deviation may be generated in both optical axes due to the aging or a change in temperature and moreover a very expensive mechanism is also required because any deviation of a optical axis must be eliminated even in case each element is moved along the optical axis for a the focusing.

SUMMARY OF THE INVENTION

It is an object of the present invention to provide an optical system for radiaton thermometer which includes a variety of improvements over the prior art, compact design and simplified adjustment and minimize any problems in aging, temperature change or deviation of optical axes in the focusing.

In order to attain the object described above, the present invention is characterized in that the main mirror in the optical system for measurement is used as an element of the optical system for indicating the area of measurement, the light bundle reflected by said main mirror is directly guided to the light sensing element for temperature measurement and the area of measurement is indicated by means of the main mirror.

The above and other objects, features and advantages of the present invention will become apparent from the following detailed description taken in conjunction with the accompanying drawings.

DETAILED DESCRIPTION OF THE PREFERRED EMBODIMENTS

Figure 1:
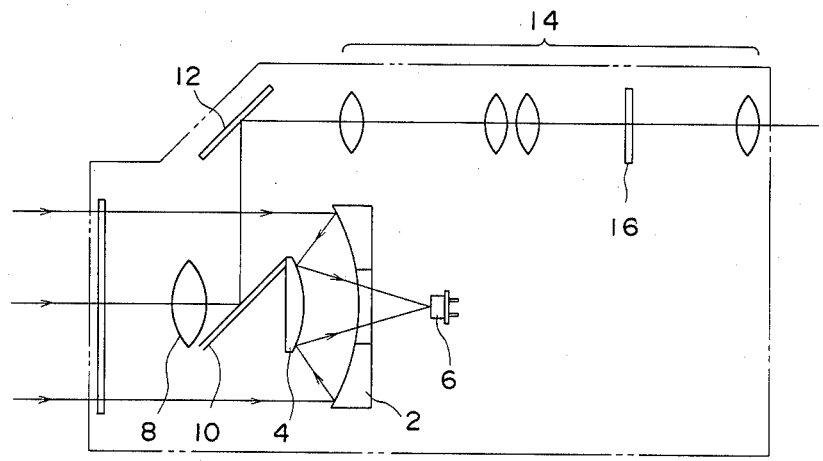
FIG. 1 is a longitudinal sectional view illustrating an example of the prior art.
Figure 2:
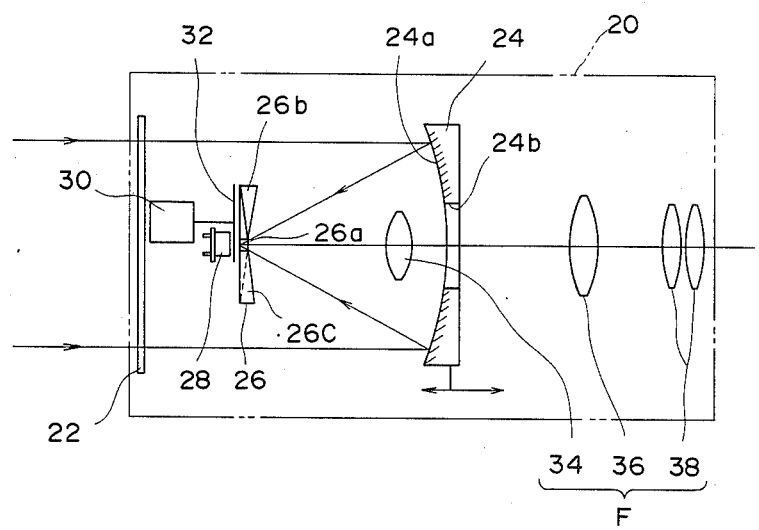
FIG. 2 is a longitudinal sectional view illustrating the optical system of an embodiment of the present invention.

A longitudinal sectional view of an optical system of a preferred embodiment of the present invention is shown in FIG. 2. Reference numeral (20) represents a radiation thermometer body and numeral (22) denotes a protection filter provided at the front surface thereof. The incident light from a measuring object having passed the protection filter (22) is reflected by a concaved reflecting surface (24a) of a reflector (24) which is provided with an aperture (24b) on its optical axis. The incident light reflected by the reflector (24) enters a focusing plate (26) disposed in the vicinity of an image forming plane of the reflector (24).

On the optical axis of focusing plate (26), a through hole (26a) similar to a small, restrictive, pin-hole means which allows transmission of an infrared light component of the incident light is formed. The infrared light component having passed through this hole (26a is received by a light sensing element (28) and is used for measurement of radiation temperature of a measured object. Here, a chopper (32), which is rotated by a motor (30) to intermittently allow transmission of light to the light sensing element (28), is provided between the through hole (26a and the light sensing element (28). Thereby, an AC signal is output from the light sensing element (28).

The focusing plate (26) is composed of a pair of split image prisms (26b), (26c) of which a dividing line is extending in the vertical direction on the image plane and reflects the incident light from the concaved reflecting surface (24a) of reflector (24) toward the aperture (24b) thereof. This reflected light is guided to a finger lens system (F) which comprises a relay lens (34), a condenser lens (36) and an eyepiece (38) and is disposed in such a way as passing through the aperture (24b) of reflector (24) and is used for monitoring an image of a measured object on the focusing plate (26). Here, the optical axis of finder lens system (F) is disposed so that it coincides with that of the reflector (24). In the visual field of the finder, an image of a measured object is monitored and since the through hole (26a) on the focusing plate (26) does not reflect the light, a finder image of the corresponding part is not formed, displaying the location of the range of measurement in the measured object to an operator.

Figure 3A:
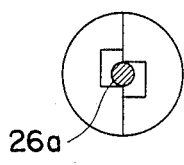
FIGS. 3(a), (b) illustrate the display condition in the finder.
Figure 3B:
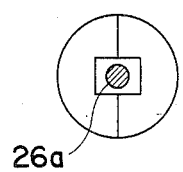

Moreover, since the focusing plate (26) is composed of a pair of split prisms (26b), (26c), if the reflector (24) is not focused on the measured object, a finder image is deviated vertically as shown in FIG. 3(a). In this case, the reflector (24) is moved manually along the optical axis, for the focusing and the focusing can be realized easily by eliminating the vertical deviation between the right and left images, as shown in FIG. 3(b). In FIGS. 3(a) and (b), (A) is a display of the area of measurement corresponding to the through hole 26a.

According to the embodiment, the reflector (34) operates as a measuring optical system which guides the light to the light sensing element (28) from the measuring object, and also as a part of the optical system for monitoring in order to form a finder image in combination with the focusing plate (26) and the finder lens system (F). Namely, the construction can be simplified and is formed be compact by reducing the number of constituting elements of the optical system and moreover the optical axes of the measuring optical system and optical system for monitoring can be coincided easily. If the optical axis of reflector (24) is deviated from that of finder lens system (F) by the focusing, since the finder lens system (F) is directed to the through hole (26a) through which the light bundle passes, the measuring area is always displayed correctly. Thereby, the movable mechanism for the focusing is not required to have severe accuracy and realizes cost saving.

In addition, the through hole (26a of focusing plate (26) restricts a width of the incident light bundle and is also used for displaying the area of measurement in the visual field of the finder. Therefore it is no longer necessary to respectively use the members for individually attaining these functions and such through hole is effective to realize a simplified and compact construction. Moreover, since the finder lens system is disposed in such a way as passing through the aperture (24b) or light transmitting portion of reflector (24), the construction can be designed in compact and a refractive force of reflector (24) for the transmitting light can be eliminated. Thereby, the finder lens system is free from the influence even when the reflector (24) is moved for the focusing.

In this embodiment of the present invention, since the focusing plate (26) is composed of a pair of split image prisms (26b) and (26c), the focusing can be realized easily and since at least a part of the light bundle inclined for the optical light from the reflector (24) can be guided to the finder lens system through reflection in the direction almost parallel to the optical axis, a bright finder image can be obtained.

Figure 4:
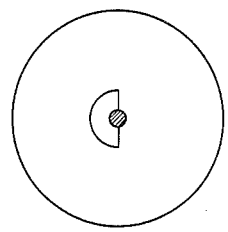
FIG. 4 is a modification of an example of the display described above.

Although an image in the area of measurement is not formed in this embodiment, a little dark image corresponding to the area of measurement can be displayed by forming a light dividing film which allows transmission of infrared light component but reflects a visible light component for about 80% at the through hole (26a of focusing plate (26). Moreover, it is allowed to provide a prism only at a part of measuring area in order to easily monitor the image not focused in place of the split image prisms (26b) and (26c) of the bisectional type used in this embodiment. In this case, the finder display as shown in FIG. 4 can be obtained.

Figure 5A:
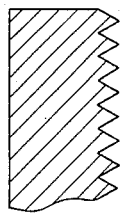
FIGS. 5(a), (b) are sectional views illustrating a modification example of a focusing plate and an enlarged view of the principal part.
Figure 5B:
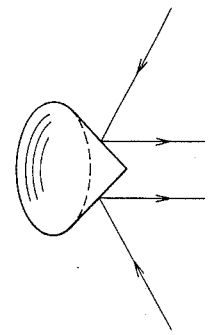
FIGS. 5(c), (d) are respectively enlarged views of a principal part illustrating another modification example of focusing plate.
Figure 5C:
Figure 5D:
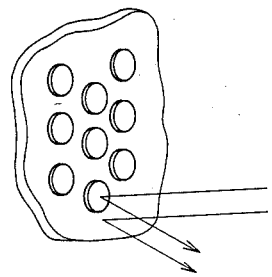
Figure 6:
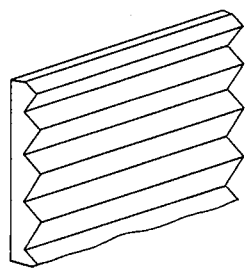
FIGS. 6, 7 are enlarged perspective views of principal parts respectively illustrating another modification example.
Figure 7:
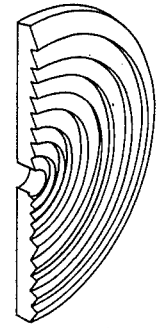

In place of a pair of split image prisms (26b) and (26c), a reflection type prism arranging many small cones as shown in the sectional view of FIG. 5 (a) and in the enlarged perspective view of a unit of FIG. 5(b), a reflection type prism arranging many small square cones (microprisms) shown in FIG. 5(c) or a reflection type phase grid which deflects the light by diffraction as shown in FIG. 5(d may be used in the present invention. Furthermore, a roof-type microprism as shown in the perspective view of FIG. 6 or a reflection type Fresnel lens shown in the perspective view of FIG. 7 can also be used and in case a measuring object is sufficiently bright, only a diffusion plate may also be used.

Figure 8:
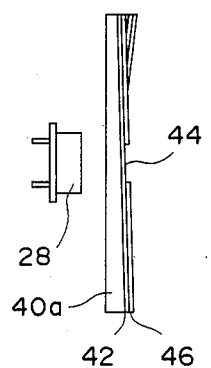
FIG. 8 is a sectional view illustrating another modification example of the focusing plate.

It is also allowed as shown in FIG. 8, that the split image prisms (40a and (40b ) are formed by an infrared light transmitting material, a semi-permeable film (42) which transmits the infrared light component but reflects the visible light component for about 80% is vacuum-deposited on the entire part of the inclined surface and a full reflection film (46) may also be vacuum-deposited to the area other than the measuring area (44) on said film. In this case, the light reflected from the measuring area (44) is less than the light reflected from the other area and therefore the range of measurement is displayed a little darker in the finder. It is also possible to form the reflector (24) with a material which allows transmission of the visible light.

Figure 9:
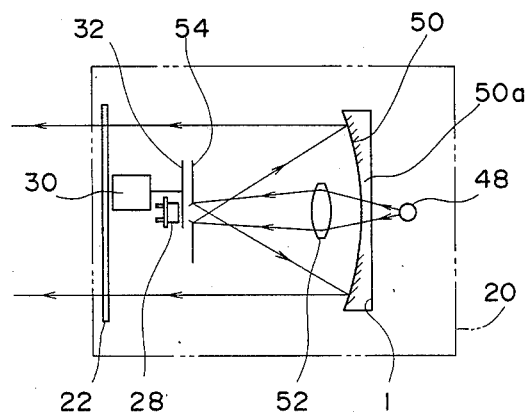
FIG. 9 is a longitudinal sectional view illustrating an optical system of another embodiment.
Figure 10:
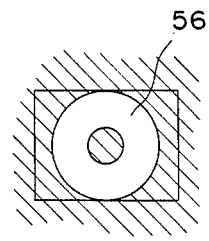
FIG. 10 illustrates the measuring range display condition of the optical system shown in FIG. 9.
Figure 11:
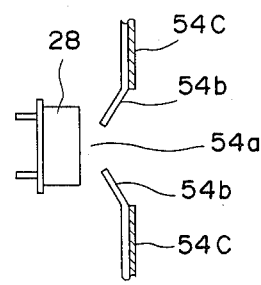
FIG. 11 is an enlarged view of a principal part of the focusing plate.

FIG. 9 is a longitudinal sectional view illustrating another embodiment of the present invention, where the like parts of the preceding embodiment are given the like numerals and these are not further explained. In FIG. 9, numerals (48) represent a light source disposed on the optical axis. The light emitted from said light source (48) is condensed by a transmitting lens (52) at the transmitting part (50a of the center of reflector (50) and is then guided to the focusing plate (54). As shown in FIG. 11 as the enlarged view, the focusing plate (54) has a through hole (54a which becomes the measuring area surrounded by the reflecting surface (54b) formed like a cone. The light emitted from the light source (48) is reflected by this reflecting surface (54b), further reflected by the concaved reflecting surface (50b) of the reflector (50) and then projected to the measuring object. Since the surface of focusing plate (54) except for the measuring area is provided with a black plate (54c), a ring image (56) is formed on the measuring object as shown in FIG. 10, displaying the range of measurement.

According to this embodiment, the range of measurement can be recognized without bringing the face toward the radiation thermometer.

As described above, the optical system for the radiation thermometer of the present invention is characterized in comprising the reflector having the concaved reflecting surface which reflects the incident light reflected from the measuring object and the transmitting part provided to the periphery of the optical axis thereof, the focusing plate having the small measuring area, on said optical axis, which transmits the infrared light component of the incident light reflected by the reflecting surface, the light sensing element which senses the infrared light component having passed said measuring area and provides an output in accordance with said infrared light component, and the display means which displays said measuring area with the light flux which is reflected by the reflecting surface of said reflector and transmits the transmitting part. In this constitution, since the reflector is used both in the optical system for measuring temperature and the optical system for displaying the range of measurement, the optical axes of both optical systems can be coincided easily and the construction can be simplifed and designed compact. Moreover, if deflection is generated between both optical axes, the range of measurement is displayed correctly and therefore the movable mechanism for the focusing is not required to have severe accuracy and cost saving can also be realized.

It is convenient for display of both the measured object and the range of measurement to realize the finder display by providing a reflecting means to the focusing plate and using the light flux reflected by the reflector and said reflecting means. Particularly when a through hole is used as the measuring area, and image is not displayed only within the range of measurement and thereby the position of it can be displayed and the range of measurement can be displayed with a very simplified construction.

Furthermore, construction can be formed more compact by forming the transmitting part of the reflector as an aperture and arranging the lens system for the finder display through said through hole. When a pair of split image prisms are used as the reflecting means, the focusing condition can be recognized easily and the focusing operation can be more simplified.

What is claimed is:

1. An optical system for a radiation thermometer comprising:
    means for reflecting light coming from an object to be measured, said reflecting means including a light reflecting surface concave to the object side and a light transmitting portion located in a center of the light reflecting surface;
    means for receiving light reflected by said reflecting means to produce an electric signal indicative of the intensity of light received thereon for measuring the temperature of the object;
    means located between said reflecting means and said receiving means for restricting light to be received by said receiving means, said restricting means including a focusing plate located near an image forming plane of the light reflecting surface of said reflecting means, said focusing plate including a light reflecting portion for further reflecting light which has been reflected by the light reflecting surface of said reflecting means towards the light transmitting portion of said reflecting means, and a light transmitting portion, located on an optical axis of the light reflecting surface, through which light reflected by said reflecting means passes towards said receiving means; and
    means for indicating a position of said reflecting means relative to the object, said indicating means including a finder optical system indicating an image of the object formed by said reflecting means with the position of the light transmitting portion of said restricting means by use of light which has been reflected by the light reflecting surface of said reflecting means and which is reflected by the light reflecting portion of said focusing plate of said restricting means, said finder optical system being arranged so that an optical axis of the optical system coincides with the optical axis of the light reflecting surface of said reflecting means.

2. An optical system for a radiation thermometer as claimed in claim 1, wherein said light reflecting portion of the focusing plate includes a pair of split image prisms whose split line is perpendicular to the optical axis of said reflecting means.

3. An optical system for a radiation theremometer as claimed in claim 1, wherein said light reflecting portion of the focusing plate includes a plurality of minute and conic light reflecting members located on a plane perpendicular to the optical axis of said reflecting means.

4. An optical system for a radiation thermometer as claimed in claim 1, wherein said light reflecting portion of the focusing plate includes a plurality of light reflecting type micro prisms located on a plane perpendicular to the optical axis of said reflecting means.

5. An optical system for a radiation thermometer as claimed in claim 1, wherein said light reflecting portion of the focusing plate includes a plurality of light reflecting type minute roof prisms arranged on a plane perpendicular to the optical axis of said reflecting means.

6. An optical system for a radiation thermometer as claimed in claim 1, wherein said light reflecting portion of the focusing plate includes a light reflecting type Fresnel lens.

7. An optical system for a radiation thermometer as claimed in claim 1, wherein said focusing plate is made of a material through which an infrared light component reflected by said reflecting means can be passed, said focusing plate having a light dividing layer located at a surface which faces said reflecting means, said light dividing layer being provided within said light transmitting portion so that an infrared light component of light reflected by said reflecting means can be passed therethrough while the visible light component thereof is reflected by said light dividing layer, and a light reflecting layer provided around said light transmitting portion, and wherein said indicating means includes a finder optical system for forming an image of the object and said light transmitting portion by said visible light component.

8. An optical system for a radiation thermometer comprising:
    a mirror having a light reflecting surface concave to the object side for reflecting light coming from an object to be measured, and a light transmitting portion provided around an optical axis of the light reflecting surface;
    a focusing plate located near an image forming plane of said light reflecting surface, having a restrictive light transmitting portion through which the light reflected by the light reflecting surface passes, and a light reflecting portion which reflects the light reflected by the light reflecting surface from passing therethrough;
    a light receiving element for receiving light which has been reflected by said light reflecting surface of said mirror and is transmitted through the light transmitting portion of the focusing plate and for producing an electrical signal representative of the temperature of the object; and
    a finder optical system, located to receive light which has passed through the light transmitting portion of the mirror, through which an image of the object is formed on the light reflecting portion of said focusing plate.

9. An optical system for a radiation thermometer as claimed in claim 8, wherein a finder optical system is arranged so that an optical axis of the finder optical axis coincides with an optical axis of the light reflecting surface of the mirror.

10. An optical system for a radiation thermometer comprising:
- a mirror having a light reflecting surface for reflecting light coming from an object to be measured; a member, located near an image forming plane of said light reflecting surface, having a measuring area for restricting an area to be measured and a light reflecting portion provided around said measuring area;
- a light receiving infrared element for receiving light which has been reflected by said mirror and passes through said measuring area and for producing an electric signal representative of the temperature of the object; and
- a light used for displaying emitter for emitting light towards the light reflecting portion of said member, wherein the position of said measuring area is indicated on the object by the light which has been emitted from said light emitter and is reflected on the light reflecting portion of said member and on the light reflecting surface of said mirror.

11. An optical system for a radiation thermometer as claimed in claim 10, wherein the light emitter is arranged on an optical axis of the light reflecting surface of the mirror.

12. An optical system for a radiation thermometer comprising:
- means for reflecting light coming from an object to be measured;
- means for receiving light reflected by said reflecting means for producing an electric signal representative of the temperature of the object;
- means for restricting light to be received by said receiving means, including a member having a measuring area through which light reflected by said reflecting means passes towards said receving means, and a light reflecting portion provided around said measuring area for reflecting light incident thereon towards said reflecting means; and
- means for emitting light towards said light reflecting portion of said member, wherein a position of said measuring area is indicated on the object by use of light which has been emitted by said light emitting means and is reflected by said light reflecting portion of said member of said restricting means and by said reflecting means in turn.

13. An optical system for a radiation thermometer as claimed in claim 12, wherein the light emitting means is arranged on an optical axis of the light reflecting means.

* * * * *